(12) United States Patent
Wang et al.

(10) Patent No.: US 11,054,310 B2
(45) Date of Patent: Jul. 6, 2021

(54) SPECTRAL SENSOR SYSTEM EMPLOYING A DEEP LEARNING MODEL FOR SENSING LIGHT FROM ARBITRARY ANGLES OF INCIDENCE, AND RELATED HYPERSPECTRAL IMAGING SENSOR

(71) Applicant: Coherent AI LLC, Redwood City, CA (US)

(72) Inventors: Xingze Wang, Durham, NC (US); Yibo Zhu, Redwood City, CA (US); Xin Lei, San Carlos, CA (US)

(73) Assignee: Coherent AI LLC, Redwood City, CA (US)

( * ) Notice: Subject to any disclaimer, the term of this patent is extended or adjusted under 35 U.S.C. 154(b) by 141 days.

(21) Appl. No.: 16/562,324

(22) Filed: Sep. 5, 2019

(65) Prior Publication Data
US 2021/0072081 A1  Mar. 11, 2021

(51) Int. Cl.
  *H04N 5/225* (2006.01)
  *G01J 3/28* (2006.01)
  *G06N 20/00* (2019.01)
(52) U.S. Cl.
  CPC ............ *G01J 3/2803* (2013.01); *G06N 20/00* (2019.01); *H04N 5/2254* (2013.01); *H04N 5/2258* (2013.01); *G01J 2003/283* (2013.01)
(58) Field of Classification Search
  CPC ... H04N 5/2254; H04N 5/2258; G01J 3/2803; G06N 20/00
  USPC ......................................................... 348/262
  See application file for complete search history.

(56) References Cited

U.S. PATENT DOCUMENTS

| | | | |
|---|---|---|---|
| 2014/0146207 A1* | 5/2014 | Yokogawa | G02B 5/201 348/281 |
| 2014/0320858 A1 | 10/2014 | Goldring et al. | |
| 2015/0211922 A1 | 7/2015 | Yu | |

FOREIGN PATENT DOCUMENTS

| | | |
|---|---|---|
| CN | 105913123 B | 8/2018 |
| WO | 2013/064510 A1 | 5/2013 |

OTHER PUBLICATIONS

Wang et al., "Spectral analysis based on compressive sensing in nanophotonic structures", Optics Express, vol. 22, No. 21, pp. 25608-25614, Oct. 20, 2014.
(Continued)

*Primary Examiner* — Usman A Khan
(74) *Attorney, Agent, or Firm* — Chen Yoshimura LLP

(57) ABSTRACT

A spectral sensing system includes an array of sampling optical elements (e.g. filters) and an array of optical sensors, and a deep learning model used to process output of the optical sensor array. The deep learning model is trained using a training dataset which includes, as training inputs, optical sensor output generated by shining each one of multiple different light waves with known spectra on the sampling optical element array for multiple different times, each time from a known angle of incidence, and as training labels, the known spectra of the multiple light waves. The trained deep learning model can be used to process output of the optical sensor array when light having an unknown spectrum is input on the sampling optical element array from unknown angles, to measure the spectrum of the light. The spectral sensing system can also be used to form a hyperspectral imaging system.

22 Claims, 9 Drawing Sheets

(56) References Cited

OTHER PUBLICATIONS

Goossens et al., "Finite aperture correction for spectral cameras with integrated thin-film Fabry—Perot filters", Applied Optics, vol. 57, No. 26, Sep. 10, 2018, pp. 7539-7549.

\* cited by examiner

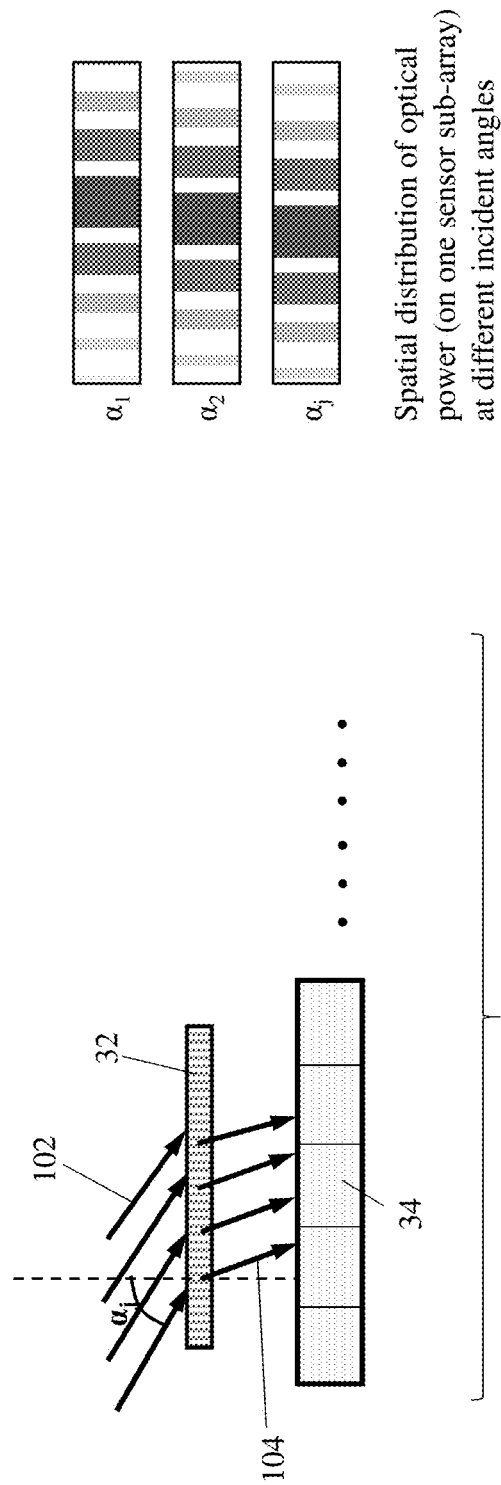

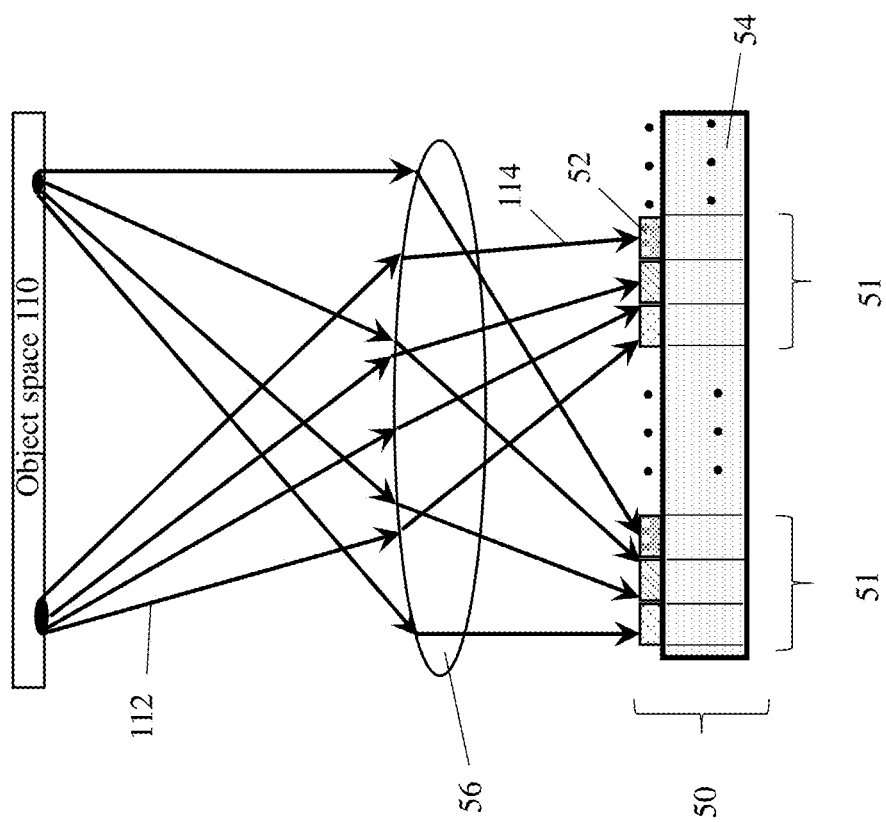

SPECTRAL SENSOR SYSTEM EMPLOYING A DEEP LEARNING MODEL FOR SENSING LIGHT FROM ARBITRARY ANGLES OF INCIDENCE, AND RELATED HYPERSPECTRAL IMAGING SENSOR

BACKGROUND OF THE INVENTION

Field of the Invention

This invention relates to optical sensing devices, and in particular, it relates to spectral sensors that use a deep learning model to process sensor data for free-space coupled spectral sensing, and related hyperspectral imaging sensors.

Description of Related Art

Spectrometers using an integrated spectral filter and light sensor structure have been described. For example, U.S. Pat. Appl. Pub. No. 20150211922, Jul. 30, 2015, describes a spectrometer which "employs multiple filters having complex filter spectra that can be generated robustly from received light over short optical path lengths. The complex filter spectra provide data that can be converted to a spectrum of the received light using compressed sensing techniques." (Id., Abstract). More specifically, the spectrometer includes "a frequency filter receiving light and modifying the light according to a set of different filter spectra each defining a frequency-dependent attenuation of the received light to provide a corresponding set of filtered light beams each associated with a different filter spectra; a broadband light detector receiving the set of filtered light beams to provide a corresponding set of independent measures of each filtered light beam; an electronic computer executing a program stored in non-transient memory to receive the independent measures of the filtered light beams to generate a spectrum derived from the set of independent measures, the spectrum indicating intensity as a function of frequency for different light frequencies over a range of frequencies; wherein each different filter spectra is a broadband spectrum with substantially non-periodic variations in value as a function of frequency." (Id., claim 1.) It also describes a method of measuring a spectrum using such a spectrometer, which includes "(a) illuminating a sample material to obtain multiple independent measures of each filtered light beam; (b) comparing the multiple independent measures of each light signal to known different filter spectra to produce partial spectra indicating selective frequency attenuation of a broadband light signal by the filter spectra and the sample material; and (c) combining the partial spectra into the spectrum." (Id., claim 15.)

U.S. Pat. Appl. Pub. No. 20140146207, May 29, 2014, describes a "solid-state image sensor and an imaging system which are capable of providing a solid-state image sensor and an imaging system which are capable of realizing a spectroscopic/imaging device for visible/near-infrared light having a high sensitivity and high wavelength resolution, and of achieving two-dimensional spectrum mapping with high spatial resolution. There are provided a two-dimensional pixel array, and a plurality of types of filters that are arranged facing a pixel region of the two-dimensional pixel array, the filters each including a spectrum function and a periodic fine pattern shorter than a wavelength to be detected, wherein each of the filters forms a unit which is larger than the photoelectric conversion device of each pixel on the two-dimensional pixel array, where one type of filter is arranged for a plurality of adjacent photoelectric conversion device groups, wherein the plurality of types of filters are arranged for adjacent unit groups to form a filter bank, and wherein the filter banks are arranged in a unit of N×M, where N and M are integers of one or more, facing the pixel region of the two-dimensional pixel array." (Id., Abstract.)

WIPO Pub. No. WO2013064510 describes "A spectral camera for producing a spectral output [which] has an objective lens for producing an image, a mosaic of filters for passing different bands of the optical spectrum, and a sensor array arranged to detect pixels of the image at the different bands passed by the filters, wherein for each of the pixels, the sensor array has a cluster of sensor elements for detecting the different bands, and the mosaic has a corresponding cluster of filters of different bands, integrated on the sensor element so that the image can be detected simultaneously at the different bands. The filters are first order Fabry-Perot filters, which can give any desired passband to give high spectral definition." (Id., Abstract.)

Z. Wang et al., Spectral analysis based on compressive sensing in nanophotonic structures, Optics Express, Vol. 22, No. 21, 25608-25614, 13 Oct. 2014 ("Wang et al. 2014"), describes a "method of spectral sensing based on compressive sensing. . . . The random bases used in compressive sensing are created by the optical response of a set of different nanophotonic structures, such as photonic crystal slabs. The complex interferences in these nanostructures offer diverse spectral features suitable for compressive sensing." (Id., Abstract.)

For miniaturized spectral sensing devices that combine optical filters or other sampling optical elements with optoelectronic devices such as CCD and CMOS image sensors, in practical use, the transmitted (T) or reflected (R) optical property (e.g. transmission spectra, reflected optical power distribution, etc.) of the optical filters or other sampling optical elements are known from calibration and stored in the memory of the device. When sensing the spectrum of incoming light, the readout of the sensor pixel is used together with the calibrated T or R spectra to recover the spectrum of the incoming light. Some of the optical filters, for example Bayer color filter array (CFA) and colloidal quantum dot (CQD), absorb light in a designed spectral range regardless of the angle of incidence of the incoming light. More generally, however, many optical filters or dispersive optical devices, for example photonic crystal (PC) slabs, Fabry Perot (FP) resonators and gratings, modulate light transmission based on absorptive and/or non-absorptive interactions between light and the filters, such as interference, diffraction and reflection. The T or R spectra of these sampling optical elements (filters and/or dispersive optical devices) are thus sensitive to the angle of incidence of the incoming light with respect to the normal of the surface of the filter and/or dispersive optical device. The variance of the T or R properties due to the change of angle of incidence can cause errors in spectral sensing. Therefore, in conventional practice, it is usually required to use light guiding elements or collimating lenses with these spectral sensing devices to regulate the direction of the light traveling to the sensor, which prevents the application of these optical filters in hyperspectral imaging. Alternatively, a complicated analytical model may be developed to calculate the T or R spectra at different angle of incidence as reference, as described in Thomas Goossens, Bert Geelen, Julien Pichette, Andy Lambrechts, and Chris Van Hoof, "Finite aperture correction for spectral cameras with integrated thin-film Fabry-Perot filters," Appl. Opt. 57, 7539-7549 (2018). This approach, however, cannot be generalized to all of the spectral sensing devices employing different optical filters or dispersive optical devices, especially when the feature size of the optical elements is sub-wavelength and the interactions of light with the optical elements are very complicated. In addition, the existing algorithms need the input of accurate and explicit T or R spectra of the optical filters and/or dispersive optical devices as sampling basis to perform signal reconstruction. This makes the system sensitive to even very small changes with these optical elements, and the sensing performance less robust and less predictable.

SUMMARY

Accordingly, the present invention is directed to a spectral sensing system and a hyperspectral imaging system and related methods that substantially obviate one or more of the problems due to limitations and disadvantages of the related art.

An object of the present invention is to provide a spectral sensing system that can sense the spectrum of incoming light at any arbitrary angle within a range.

Another object of the present invention is to provide a hyperspectral imaging system that utilizes such spectral sensing system.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a method implemented in a spectral sensing system, the spectral sensing system comprising an array of sampling optical elements, an array of optical sensors, and an untrained deep learning model implemented by computing processors and memories, wherein each sampling optical element is configured to have optical properties that alter a reflectance, or a transmittance, or a spatial distribution of an incident light falling on the sampling optical element as a function of wavelength to produce an altered light, wherein the optical properties of different sampling optical elements are different, wherein each optical sensor is disposed to receive altered light from one of the sampling optical elements and to convert received light intensity to an electrical signal, and wherein the deep learning model includes an input layer, an output layer, and a plurality of hidden layers connected to the input layer and the output layer and configured to perform computations on model input received at the input layer to generate model output at the output layer, the method including: a process of training the untrained deep learning model, including: generating a plurality of different light waves, each light wave having a known spectrum; shining each of the plurality of light waves on the array of sampling optical elements for a number of different times, each time from a known angle of incidence; for each light wave of known spectrum and at each known angle of incidence, recording the electrical signals output by the array of optical sensors in response to the light wave being shone on the sampling optical elements, to obtain a sensor output; and training the untrained deep learning model using the sensor output for all light waves and all angles of incidence as training inputs, and using the known spectra for all light waves as training labels, wherein each set of training input for all angles of incidence and a given light wave share a same training label, to obtain a trained deep learning model; and a process of using the trained deep learning model to measure an unknown spectrum, including: shining a target light wave having the unknown spectrum on the array of sampling optical elements at one or more unspecified angles of incidence; recording the electrical signals output by the array of optical sensors in response to the target light wave being shone on the sampling optical elements, to obtain target sensor output; inputting the target sensor output to the input layer of the trained deep learning model; and the hidden layers of the trained deep learning model performing computation on the model input received at the input layer to generate target model output at the output layer, wherein the target model output represents the unknown spectrum.

In another aspect, the present invention provides a spectral sensing system, which includes: an array of sampling optical elements, each configured to have optical properties that alter a reflectance, or a transmittance, or a spatial distribution of an incident light falling on the sampling optical elements as a function of wavelength to produce an altered light, wherein the optical properties of different sampling optical elements are different; an array of optical sensors, each disposed to receive the altered light from one of the sampling optical elements and to convert received light intensity to an electrical signal; and a trained deep learning model implemented by computing processors and memories, the deep learning model including an input layer, an output layer, and a plurality of hidden layers connected to the input layer and the output layer and configured to perform computations on model input received at the input layer to generate model output at the output layer, the deep learning model being coupled to receive, as the model input, data representing the electrical signals generated by the array of optical sensors, wherein the deep learning model is configured to compute, as the model output, a spectrum of a light wave shining on the array of sampling optical elements at one or more unspecified angles of incidence, the deep learning model having been trained using a training dataset which includes: (1) training input, which have been obtained by shining each one of a plurality of different light waves with known spectra on the array of sampling optical elements for a number of different times, each time from a known angle of incidence, while recording the electrical signals output by the array of optical sensors as the training input, and (2) the known spectra of the plurality of light waves as training labels, wherein each set of training input for all angles of incidence and a given light wave share a same training label.

In another aspect, the present invention provides a method implemented in a hyperspectral imaging system, the hyperspectral imaging system comprising an imaging sensor formed of a plurality of identical spatial pixels, one or more imaging optical elements configured to form an image on the imaging sensor, and an untrained deep learning model implemented by computing processors and memories, each spatial pixel including an array of sampling optical elements and an array of optical sensors, wherein each sampling optical element is configured to have optical properties that alter a reflectance, or a transmittance, or a spatial distribution of an incident light falling on the sampling optical element as a function of wavelength to produce an altered light, wherein the optical properties of different sampling optical elements of each spatial pixel are different, wherein each optical sensor is disposed to receive altered light from one of the sampling optical elements and to convert received light intensity to an electrical signal, and wherein the deep learning model includes an input layer, an output layer, and a plurality of hidden layers connected to the input layer and the output layer and configured to perform computations on model input received at the input layer to generate model output at the output layer, the method including: a process of training the untrained deep learning model, including: generating a plurality of different light waves, each light wave having a known spectrum; shining each of the plurality of light waves on one of the spatial pixels for a number of different times, each time from a known angle of incidence; for each light wave of known spectrum and at each known angle of incidence, recording the electrical signals output by the array of optical sensors of the spatial pixel in response to the light wave being shone on the spatial pixel, to obtain a sensor output; and training the untrained deep learning model using the sensor output for all light waves and all angles of incidence as training inputs, and using the known spectra for all light waves as training labels, wherein each set of training input for all angles of incidence and a given light wave share a same training label, to obtain a trained deep learning model; and a process of using the imaging sensor and the trained deep learning model to measure a hyperspectral image, including: by the imaging optical elements, forming an image of an object space on the imaging sensor; for each spatial pixel, recording the electrical signals output by the array of optical sensors in response to light received by the spatial pixel, to obtain target sensor output; inputting the target sensor output to the input layer of the trained deep learning model; and the hidden layers of the trained deep learning model performing computation on the model input received at the input layer to generate target model output at the output layer, wherein the target model output represents a spectrum of the light received by the spatial pixel.

In another aspect, the present invention provides a hyperspectral imaging system, which includes: an imaging sensor formed of a plurality of identical spatial pixels, each spatial pixel including: an array of sampling optical elements, each configured to have optical properties that alter a reflectance, or a transmittance, or a spatial distribution of an incident light falling on the sampling optical elements as a function of wavelength to produce an altered light, wherein the optical properties of different sampling optical elements are different; and an array of optical sensors, each disposed to receive the altered light from one of the sampling optical elements and to convert received light intensity to an electrical signal; and one or more imaging optical elements configured to form an image on the imaging sensor; and a trained deep learning model implemented by computing processors and memories, the deep learning model including an input layer, an output layer, and a plurality of hidden layers connected to the input layer and the output layer and configured to perform computations on model input received at the input layer to generate model output at the output layer, the deep learning model being coupled to receive, as the model input, data representing the electrical signals generated by the array of optical sensors of any one of the spatial pixels, wherein the deep learning model is configured to compute, as the model output, a spectrum of a light wave shining on the one of the spatial pixels, the deep learning model having been trained using a training dataset which includes: (1) training input, which have been obtained by shining each one of a plurality of different light waves with known spectra on a selected spatial pixel for a number of different times, each time from a known angle of incidence, while recording the electrical signals output by the array of optical sensors as the training input, and (2) the known spectra of the plurality of light waves as training labels, wherein each set of training input for all angles of incidence and a given light wave share a same training label.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 4A and 4B schematically illustrate a spectral sensor in a spectral sensing system according to a second embodiment of the present invention.

FIGS. 6A and 6B schematically illustrate a hyperspectral imaging system according to another embodiment of the present invention which uses the spectral sensor of the first to third embodiments.

DETAILED DESCRIPTION OF PREFERRED EMBODIMENTS

Figure 1A:
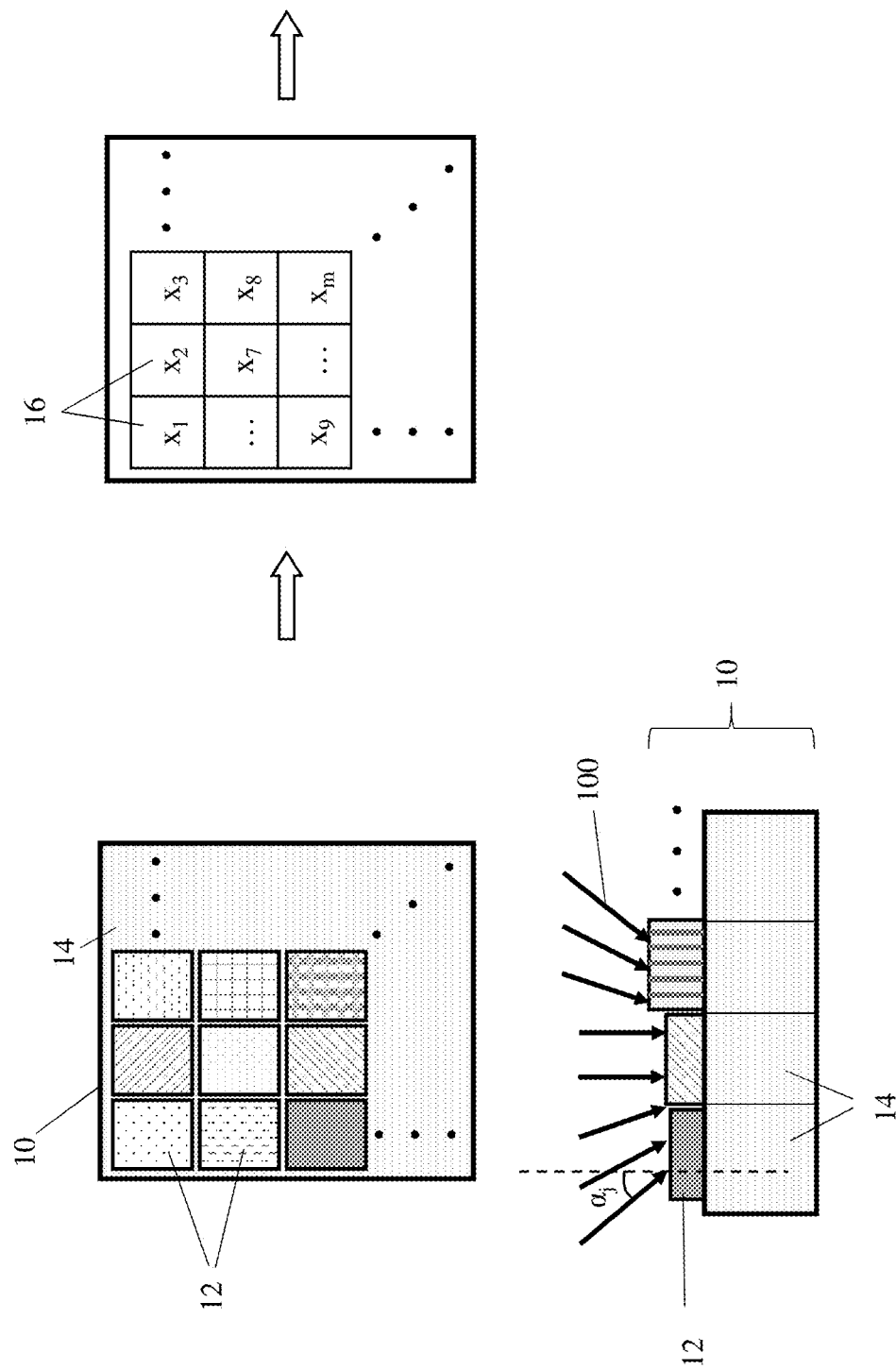
FIGS. 1A and 1B schematically illustrate a spectral sensing system and method using a spectral sensor and a deep learning model to perform free-space-coupled spectral sensing according to a first embodiment of the present invention.
Figure 1B:
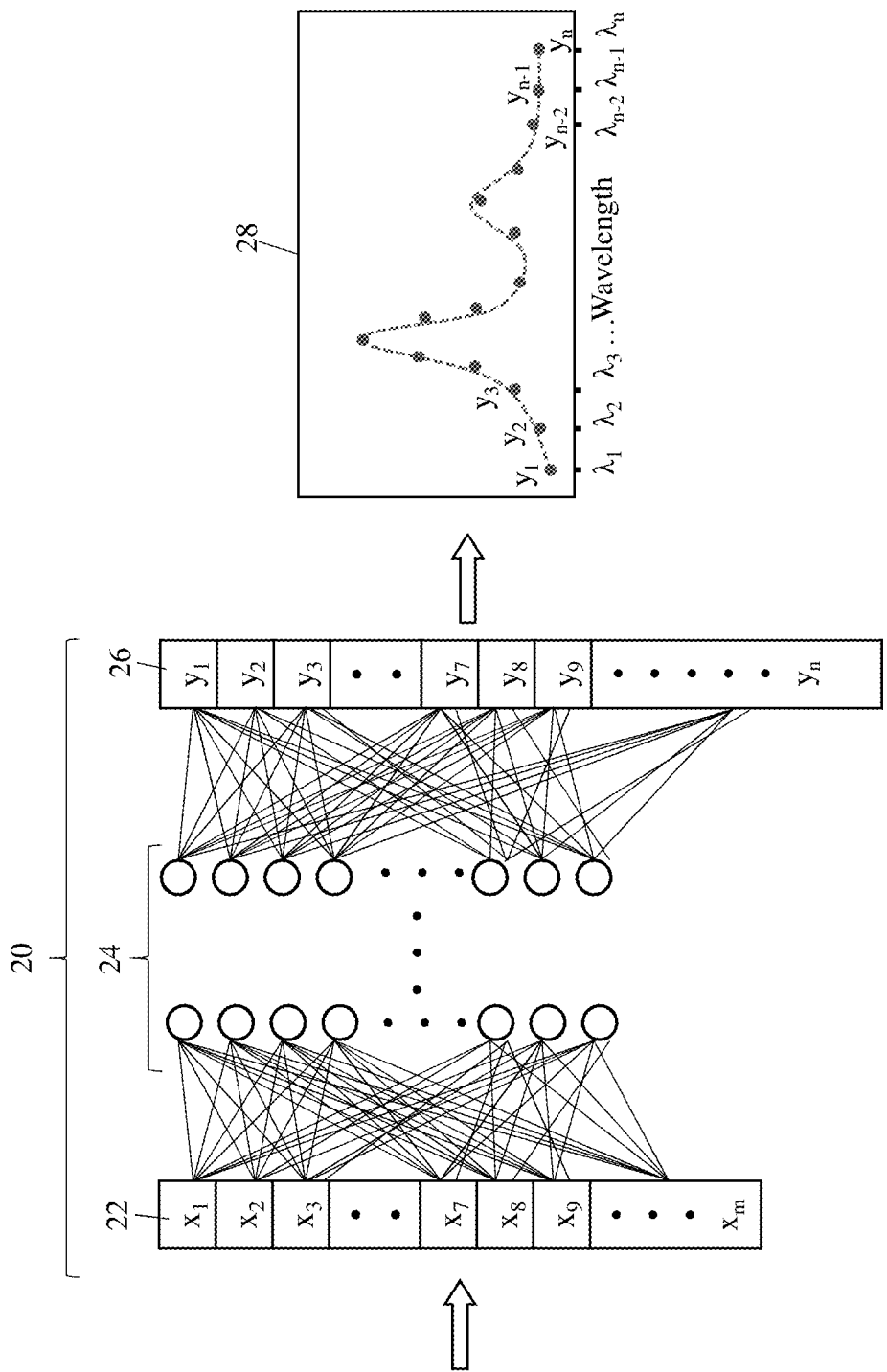
Figure 2:
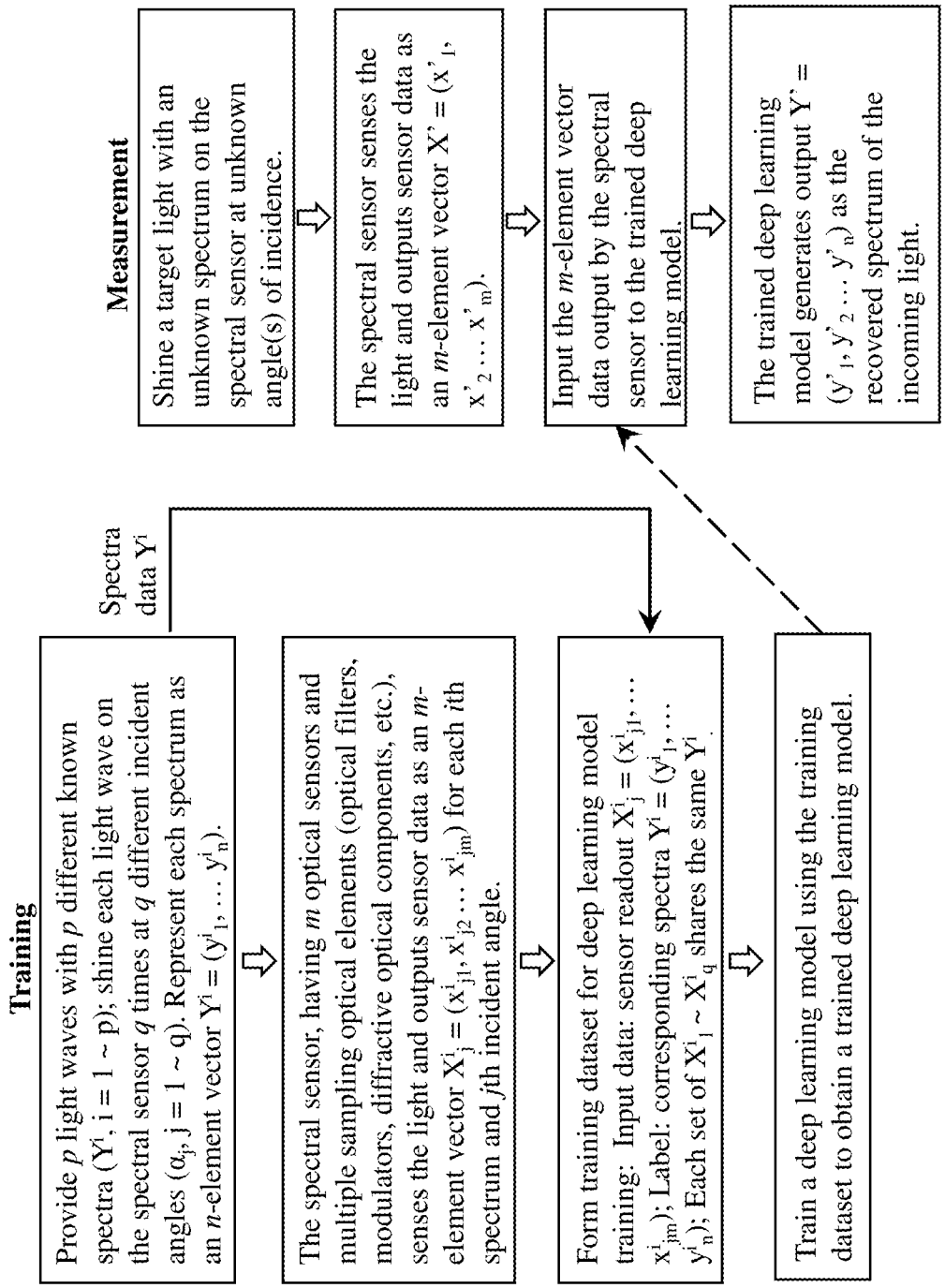
FIG. 2 schematically illustrates a method for training a deep learning model and using the trained model to process data from a spectral sensor to perform free-space-coupled spectral sensing according to various embodiments of the present invention.
Figure 3:
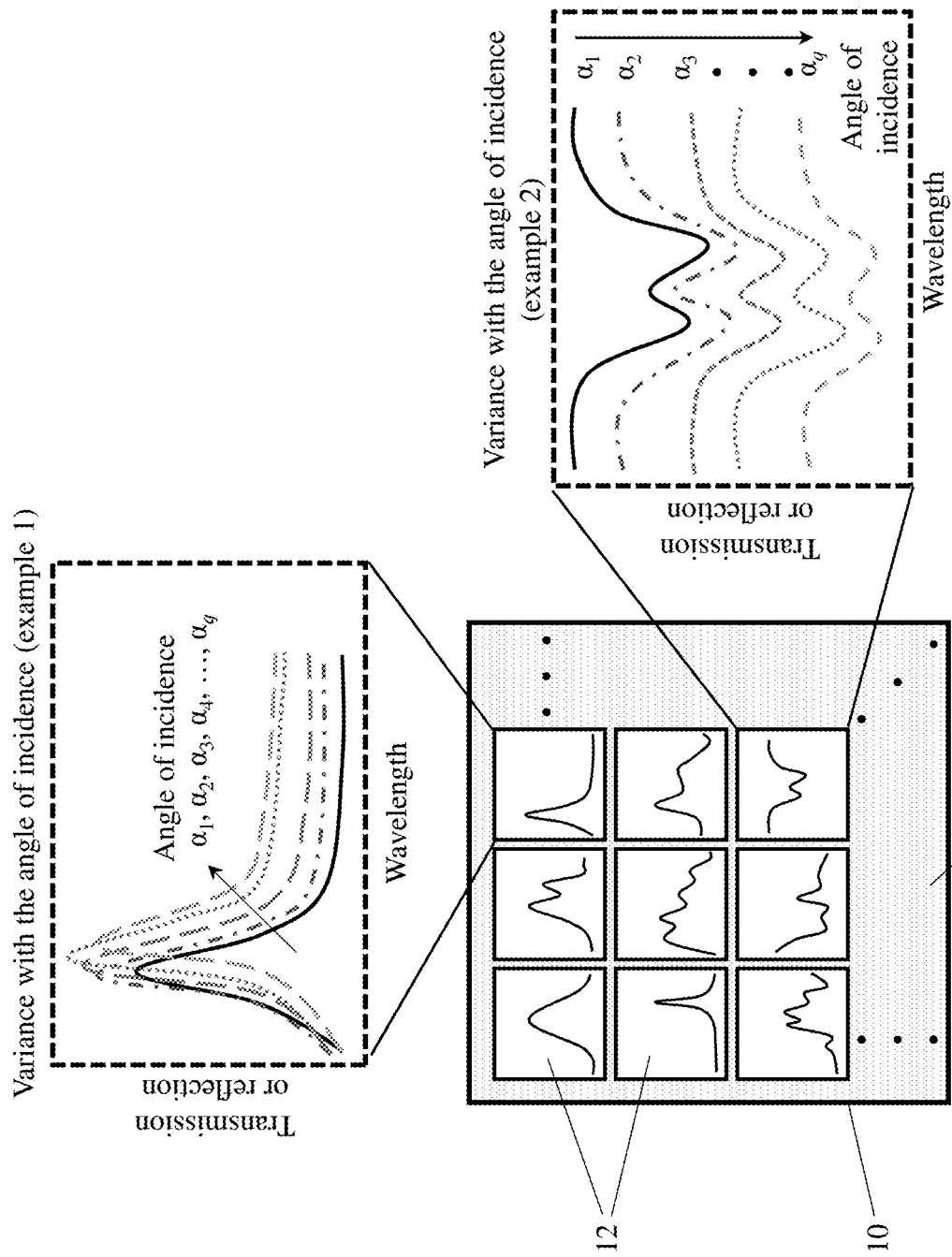
FIG. 3 illustrates variations of transmission spectra with angle of incidence in the spectral sensing system of the first embodiment.

Embodiments of this invention provide a spectral sensing system and related method for free-space-coupled spectral sensing that can accommodate a wide range of angles of incidence, and a hyperspectral imaging system that incorporates such a spectral sensing system. The spectral sensing system includes an array of optical sensors (e.g. photodiodes, CCD or CMOS image sensors, including related circuitry for converting outputs of the optical sensors to electrical signals), a set of sampling optical elements (which are optical elements that alter the reflectance and/or transmittance of the incident light as a function of wavelength, such as spectral filters, or alter the spatial distribution of the incident light as a function of wavelength, such as dispersive devices like gratings, etc.) disposed on the optical path of the incoming light traveling to the optical sensors, one or more computing processors along with data storage units (i.e. memories), as well as a deep learning (DL) model for signal processing to recover the spectral information. The deep learning model may be implemented as computer executable program codes stored in the memories and executed by the processors.

In a first embodiment, illustrated in FIGS. 1A-3, the spectral sensing system includes an array of m sampling optical elements 12, disposed on the surface of a corresponding array of m optical sensors 14, where each optical sensor receives the light that has interacted with one corresponding sampling optical element. In this embodiment, the sampling optical elements 12 are spectral filters. Note that in the top plan view in FIG. 1A, for simplicity, the optical sensors 14 are not drawn as individual units. The transmission (T) or reflection (R) optical properties of the different sampling optical elements 12 are different from each other (see FIG. 3, which schematically depicts the spectra of the individual sampling optical elements inside the boxes representing the sampling optical elements). The T or R properties vary with the angle of incidence of the incoming light 100, defined as the angle of the incoming light falling on the surface of the sampling optical element 12 relative to the surface normal of the sampling optical element. The optical sensor array 14 and the sampling optical element array 12 form a spectral sensor array 10 (or simply referred to as a spectral sensor).

Prior to measuring an unknown spectrum, the deep learning model 20 of the spectral sensing system is first trained using known light spectra. To train the deep learning model, p different light waves with p different known spectra ($Y^i$, i=1 to p) are used to generate a training dataset. Each of the spectra may be represented as an n-element vector $Y^i=(y^i_1, \ldots y^i_n)$ at n wavelengths $\lambda_1$ to $\lambda_n$. The spectrum of each of these light waves is known, for example, having been obtained from an independent measurement using conventional spectroscopy. Each of the p light waves is projected to the spectral sensor array 10 multiple times, each time from a known angle of incidence, for a total of q angles of incidence ($\alpha_j$, j=1 to q). An identical set of q angles of incidence are used for all of the p light waves. Preferably (but not required), the q angles of incidence are all different from each other. Preferably (but not required), the q angles of incidence are distributed substantially uniformly within a solid angle range. Note that in the cross-sectional view of the spectral sensor array 10 in FIG. 1A, the incoming light 100 is shown as falling on the sampling optical elements 12 from different angles of incidence simultaneously, but during training, each time, the incoming light 100 has only one angle of incidence.

Each time at a known angle of incidence, after interaction between the light and the sampling optical elements 12, the optical sensors 14 respectively record and output the light powers received after the corresponding sampling optical elements, to generate the sensor readout 16. For each light wave with a known spectrum $Y^i$, the sensor output is recorded for each of the different angles of incidence $\alpha_j$, to obtain sensor output data $X^i_j=(x^i_{j1}, \ldots x^i_{jm})$. In other words, for each ith known spectrum and jth known angle of incidence, the sensor output $X^i_j$ is a m-element vector, m being the number of optical sensors (which equals the number of sampling optical elements in this embodiment). X is thus a p×q×m matrix. Here, each of m, n, p and q is an integer greater than 1.

The sensor output vectors $X^i_j$ are fed to the input layer 22 of the deep learning model 20 as training input, while the known spectra data $Y^i=(y^i_1, \ldots y^i_n)$ is fed to the model as the training label (ground truth) for $X^i_j$. Each set of vectors $X^i_j$ (j=1 to q), for the same known spectrum i and different angles of incidence j, shares the same label $Y^i$. The deep learning model is then trained using the training inputs and the training labels. The model 20 has a number of hidden layers 24, which perform computations on input data received at the input layer 22 and generate output data at an output layer 26, which has n nodes. The cost function used to train the model may be a root mean squared error between the output 26 of the model and the label spectra, or other quantities dependent on both the model output and the label spectra. Model training involves successively adjusting the parameters (weights) of the model to minimize the cost function. Any suitable model training method may be employed. The training process is summarized in FIG. 2.

After training the model, the system can be used to measure an unknown spectrum of a target light incoming from a wide range of different angles of incidence, including target light that simultaneously has a mix of different angles of incidence. The sensor readout generated by the optical sensors 14, which is an m-element vector $X'=(x'_1, x'_2 \ldots x'_m)$, is fed to the input layer 22 (having m nodes) of the trained model 20. After computations by the hidden layers 24, the output at the output layer 26 (having n nodes) is the recovered spectrum 28 of the target light, which is an n-element vector $Y'=(y'_1, y'_2 \ldots y'_n)$. The measurement process is also summarized in FIG. 2.

During measurement, the angles of incidence of the incoming light may be unspecified, and their range can include but is not limited to the trained angles ($\pm\alpha_j$, j=1 to q). As such, there is no need of light guiding parts (e.g. optical fiber or collimator) before the spectral sensor array 10, and the incoming light may be coupled to the spectral sensor array directly from the free space (e.g. air). Also, the system described here does not require the explicit knowledge of the T or R spectra of the sampling optical elements 12 in order to perform data analysis, and is immune to certain fluctuations in the T or R spectra of the sampling optical elements. Such fluctuations may include, for example, variations in the fabricated structures of different sampling optical elements that are designed to have the same structure due to factors in the fabrication processes (for example, when fabricating spatial pixels of a hyperspectral imaging sensor, described in more detail later); changes in properties of the sampling optical elements due to environmental factors such as temperature; change in properties of the sampling optical elements over time due to aging or other effects; etc. In embodiments of the present invention, the deep learning model does not need to be re-trained even if such fluctuations occur.

In this embodiment, the system uses an array of transmissive optical filters, such as photonic crystal (PC) slabs, Fabry Perot (FP), as the sampling optical elements. In this embodiment, the light input side of the sampling optical elements 12 faces away from the optical sensors 14; i.e., the sampling optical elements and the optical sensors are located on the same side of the incoming light (see FIG. 1A, cross-sectional view). The sampling optical elements 12 may be monolithically fabricated onto the surface of the optical sensors 14. Alternatively, the sampling optical elements 12 may be fabricated as independent devices and installed onto the optical sensors 14, with the sampling optical elements disposed close to the surfaces of the optical sensors (i.e. the distance between the sampling optical elements and the optical sensors is comparable to the wavelengths of the incoming light). Fabrication of the sampling optical elements 12 may employ standard microfabrication technologies including physical and/or chemical vapor deposition, photo- and/or electron beam-lithography, reactive ion etching, etc.

The transmission spectra of the optical filters are either broad-band or narrow-band, and either periodic or non-periodic. These spectra typically vary with the angle of incidence of the incoming light (see FIG. 3). The variance can be a shift of peak wavelengths in the spectrum (schematically depicted in example 1 in FIG. 3), a change in the magnitude of the spectrum at certain wavelengths (schematically depicted in example 2 in FIG. 3), or any changes with the profile of the spectra.

The deep learning model may be a deep neural network (DNN). The DNN takes the sensor readout as the input and outputs the recovered spectrum. The DNN may be a fully-connected network using various regularization techniques such as L2 regularization, drop-out and so on to reduce overfitting. The deep learning model may include or be replaced by other machine learning methods, such as gradient boosting trees, random forests, support vector machines to enhance the performance of the model, etc.

The cost function used to train the network may be a root mean squared error between the output and the label spectra, or other quantities dependent on both the output and the label spectra.

A spectral sensing system according to a second embodiment is described with reference to FIGS. 4A and 4B. The spectral sensing system includes a spectral sensor 30 which includes a sampling optical element 32 and an array of optical sensors 34, as well as a deep learning model implemented on computing processors and memories (not shown in the FIG. 4A). In this embodiment, the sampling optical element 32 is a transmissive grating or another transmissive dispersive optical element. The optical sampling element 32 is typically installed at a defined distance from the surface of the optical sensors 34, and the incoming light 102 transmits through and is dispersed by the sampling optical element 32 (shown as transmitted light 104) to reach the optical sensors 34. The distance between the sampling optical elements 32 and the optical sensors 34 is significantly larger than the wavelength of the light. In this embodiment, the optical property that varies with the angle of incidence is not the transmission spectra but the dispersion (here, the spatial distribution) of the transmitted light as a function of wavelength produced by the gratings 32. FIG. 4A illustrates an array of sensors 34 extending in one (or both) lateral direction and disposed behind a grating 32, and the grating disperses the incoming light in the one (or both) lateral direction. FIG. 4B illustrates three examples of spatial distributions of optical power produced by a grating for an incoming light at different angles of incidence.

In some embodiments, the spectral sensor 30 may include multiple different sampling optical elements 32 and multiple corresponding sub-arrays of optical sensors 34. In such embodiments, the sub-array of optical sensors 34 corresponding to each sampling optical element 32 detects the spatial distribution of the optical power of the light 104 produced by the sampling optical element 32. Increasing the number of sampling optical elements 32 can increase the effectiveness and accuracy of the spectral detection, but makes the system more complex. If only one transmissive dispersive optical element 32 is used, the spectral detection capability of the system may be relatively limited; for example, the range of angles of incidence may need to be restrained to within a relatively small range (for example and without limitation, about 10 degrees), and/or the shape of the spectra of the incoming light may need to be restrained to certain types of shape (for example and without limitation, spectra having a relatively slow-varying shape without sharp bands).

Regardless of the optical properties of the sampling optical elements 32 that vary with the angle of incidence, or the number of optical sensors 34 in the system, the input for the deep learning model in the embodiment of FIG. 4A remains the readout of all of the sensors (including all sensors in all sub-arrays) and the output of the model remains the spectrum of the incoming light, for both training and measurement. The deep learning model training method and the spectral measurement method are similar to those of the first embodiment, as summarized in FIG. 2.

Figure 5B:
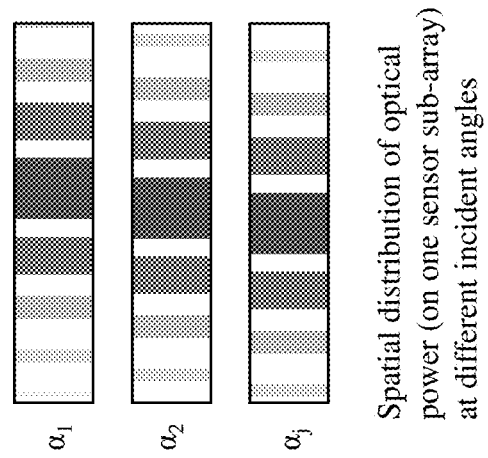
FIGS. 5A and 5B schematically illustrate a spectral sensor in a spectral sensing system according to a third embodiment of the present invention.
Figure 5A:
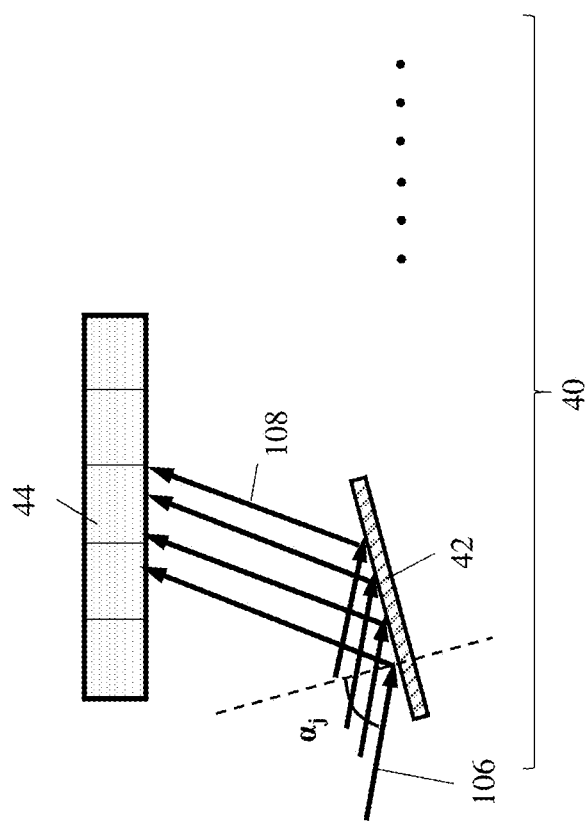

A spectral sensing system according to a third embodiment is described with reference to FIGS. 5A and 5B. Similar to the second embodiment, the spectral sensing system includes a spectral sensor 40 which includes a sampling optical element 42 and an array of optical sensors 44, as well as a deep learning model implemented on computing processors and memories (not shown in the FIG. 5A). In this embodiment, the sampling optical element 42 are reflective dispersive elements, such as reflective gratings. In this embodiment, the light input side of the sampling optical element 42 faces toward the optical sensors 44, and the incoming light 106 is reflected and dispersed by the sampling optical element to reach the optical sensors. The angle of incidence here is the angle of the direction of incoming light 106 with respective to the surface normal of the sampling optical element 42. The optical sensors 44 receive the light 108 reflected and diffracted from the sampling optical element 42 and outputs electrical signals. In this embodiment, in addition to the T or R spectrum of the sampling optical element, the spatial distribution of the reflected and diffracted optical power varies with the angle of incidence. FIG. 5A illustrates an array of sensors 44 extending in one (or both) lateral direction and disposed downstream of a grating 42, and the grating disperses the incoming light in the one (or both) lateral direction. FIG. 5B illustrates three examples of optical power distributions produced by a grating for an incoming light at different angles of incidence.

In some embodiments, the spectral sensor 40 may include multiple different reflective gratings 42 and multiple corresponding sub-arrays of optical sensors 44. In such embodiments, the sub-array of optical sensors 44 corresponding to each reflective grating 42 detects the spatial distribution of the optical power of the light 108 produced by the sampling optical element 42.

Regardless of the properties of the sampling optical elements 42 that vary with the angle of incidence, or the number of optical sensors 44 in the system, the input for the deep learning model in the embodiment of FIG. 5A remains the readout of all of the sensors (including all sensors in all sub-arrays) and the output of the model remains the spectrum of the incoming light, for both training and measurement. The deep learning model training method and the spectral measurement method are similar to those of the first embodiment, as summarized in FIG. 2.

Figure 6B:
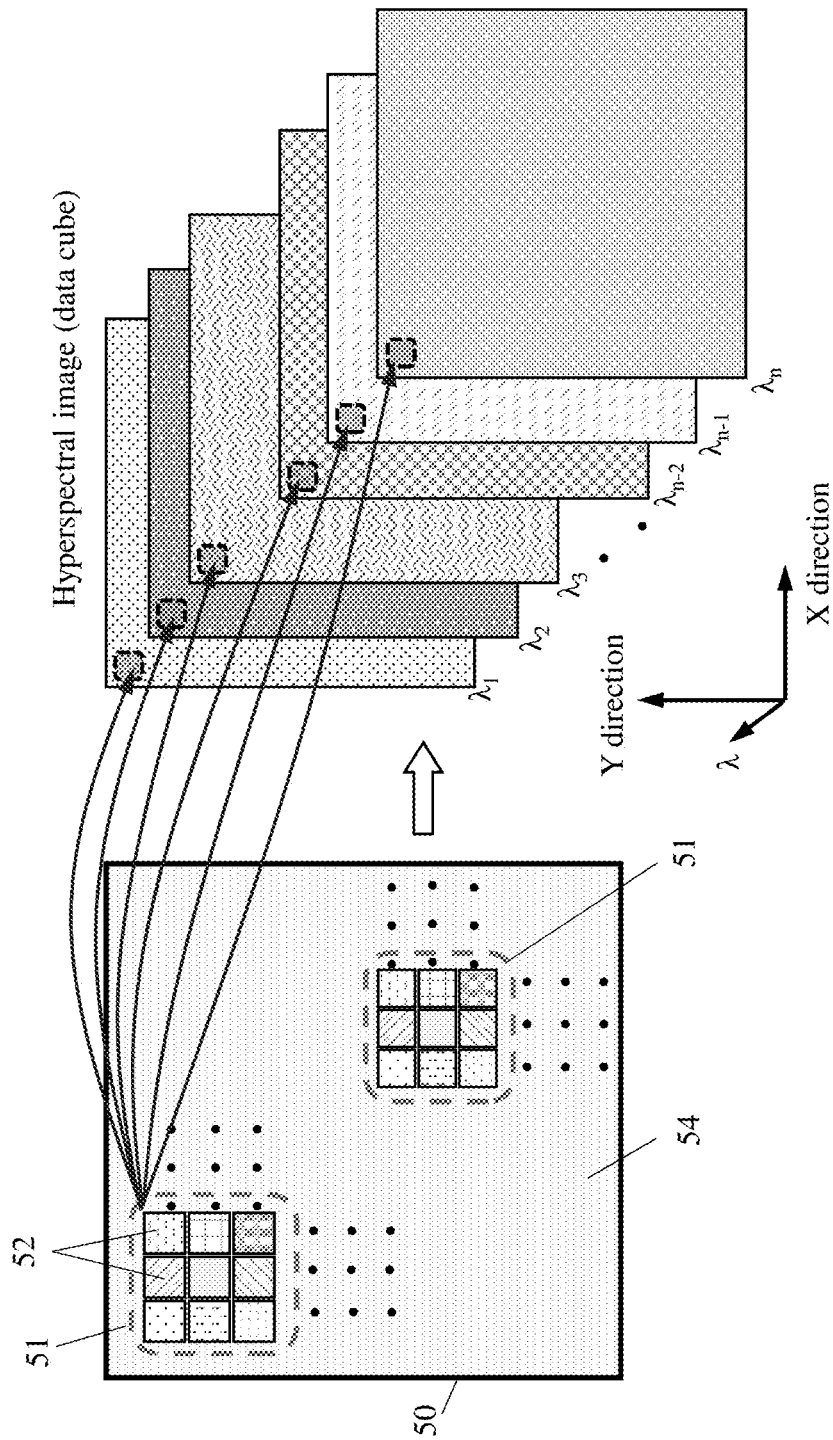

A hyperspectral imaging system according to a fourth embodiment is described with reference to FIGS. 6A and 6B.

In the first through third embodiments described above, the sampling optical elements and the optical sensors form a spectral sensor array, and the output of the spectral sensor array is fed to the deep learning model to computer the spectrum of the incoming light. The fourth embodiment provides a hyperspectral imaging sensor 50, formed of a plurality of spatial pixels 51. Each spatial pixel 51 is a spectral sensor array such as those described in the first to third embodiments, and the spatial pixels are tiled together to form the hyperspectral imaging sensor 50. The hyperspectral imaging system also includes imaging optical elements 56 such as convex or concave lenses to form an image of the object space 110 on the hyperspectral imaging sensor 50, to perform hyperspectral imaging. In this embodiment, the entire optical sensor array 54 (e.g. a CMOS image sensor) consist of a large number of small optical sensors (e.g. photodiodes), and is covered by a corresponding array of sampling optical elements 52. The array of sampling optical elements 52 include multiple sub-arrays, each sub-array corresponding to a spatial pixel 51 described above. The sub-arrays of sampling optical elements 52 for different spatial pixels 51 are preferably identical to each other, so that the deep learning model may be trained using one selected spatial pixel and the trained model may be used to process data from all spatial pixels.

The imaging optical elements 56 can change the direction of the light so that the light 112 coming from a small area in an object space 110 can be focused to a small area on the array of sampling optical elements 52. Thus, the spectrum of the light 114 falling on each spatial pixel 51 (a small area) is approximately uniform over the area of the spatial pixel, but the light is incident from a range of different angles of incidence determined by the aperture of the imaging optical element 56. The output of the array optical sensors 54 of each spatial pixel 51 is fed into the pretrained deep learning model, which processes the input to generate an output vector which is the spectrum of the light emitted by the corresponding small area of the object space. Thus, the entire hyperspectral imaging system can output a hyperspectral image which is a data cube with three dimensions, which are respectively the two spatial directions (x and y) and the optical wavelength (or frequency) (see FIG. 6B).

Figure 7:
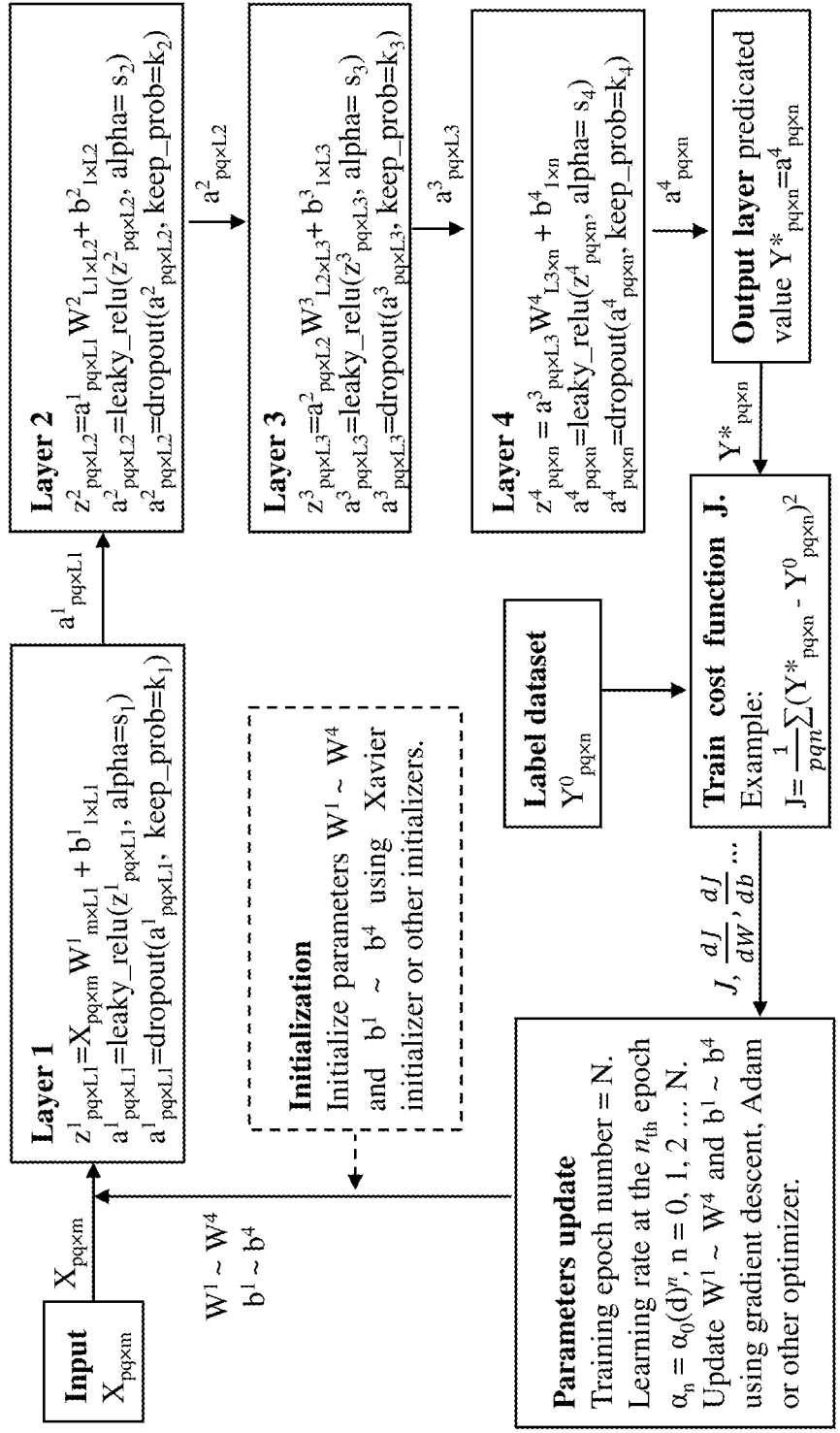
FIG. 7 schematically illustrates a deep learning network that may be used to implement embodiments of the present invention.

Any suitable deep learning model may be used to implement embodiments of the present invention. An example of such a deep learning model is a fully connected DNN (FIG. 7) implemented under a deep learning framework (e.g. TensorFlow, Keras etc.). This network consists of four hidden layers in addition to the input and output layer. Each layer uses parameters W and b as well as an activation function (e.g. leaky_relu) to generate a value a as the input of the next layer. The W and b are initialized randomly using an initializer, such the Xavier initializer available in the framework and then updated after each training epoch to reduce the cost function. The cost function is a quantity that can measure the error between the predicted values and the label values. The goal of the model is to find a combination of W and b parameters to achieve or approach the minimum of the cost function. The training is finished once the cost function reaches a very small value and nearly stops decreasing. In one specific implementation, the following hyperparameters were used in the network: p=250000, q=5, N=1000, m=9, $L_1$=200, $L_2$=300, $L_3$=200, $s_1$=0.02, $s_2$=0.02, $s_3$=0.01, $s_4$=0.001, $k_1$=$k_4$=1, $k_2$=$k_3$=0.9. Adam optimizer from the TensorFlow was used. All of these hyperparameters, structure of the network, selection of initializers, optimizers and other network components are exemplary only and do not limit the scope of the invention. They can be varied and optimized as needed.

It will be apparent to those skilled in the art that various modification and variations can be made in the spectral sensor and hyperspectral imaging sensor, and related methods, of the present invention without departing from the spirit or scope of the invention. Thus, it is intended that the present invention cover modifications and variations that come within the scope of the appended claims and their equivalents.

What is claimed is:

1. A method implemented in a spectral sensing system, the spectral sensing system comprising an array of sampling optical elements, an array of optical sensors, and a machine learning model implemented by computing processors and memories, wherein each sampling optical element is configured to have optical properties that alter a reflectance, or a transmittance, or a spatial distribution of an incident light falling on the sampling optical element as a function of wavelength to produce an altered light, wherein the optical properties of different sampling optical elements are different, wherein each optical sensor is disposed to receive altered light from one of the sampling optical elements and to convert received light intensity to an electrical signal, and wherein the machine learning model is configured to perform computations on received model input to generate model output, the method comprising:

a process of using the machine learning model to measure an unknown spectrum, wherein the machine learning model is a trained machine learning model, the process including:

shining a target light wave having the unknown spectrum on the array of sampling optical elements at one or more unspecified angles of incidence;

recording the electrical signals output by the array of optical sensors in response to the target light wave being shone on the sampling optical elements, to obtain target sensor output;

inputting the target sensor output to the trained machine learning model; and the trained machine learning model performing computation on the received model input to generate target model output, wherein the target model output represents the unknown spectrum.

2. The method of claim 1, wherein the array of sampling optical elements includes an array of spectral filters corresponding to the array of optical sensors, wherein each one of the optical sensors is disposed to receive light that has interacted with the corresponding one of the sampling optical elements.

3. The method of claim 1, wherein the array of sampling optical elements includes a plurality of transmissive dispersive optical elements, wherein the array of optical sensors includes a plurality of sub-arrays of optical sensors, each transmissive dispersive optical element corresponding to a sub-array of optical sensors and disposed at a defined distance from a surface of the sub-array of optical sensors to transmit and disperse light incident on it to the sub-array of optical sensors.

4. The method of claim 1, wherein the array of sampling optical elements includes a plurality of reflective dispersive optical elements, wherein the array of optical sensors includes a plurality of sub-arrays of optical sensors, each reflective dispersive optical element corresponding to a sub-array of optical sensors and disposed to reflect and disperse light incident on it to the sub-array of optical sensors.

5. The method of claim 1, further comprising a process of training an untrained machine learning model to obtain the trained machine learning model, the process including:

generating a plurality of different light waves, each light wave having a known spectrum;

shining each of the plurality of light waves on the array of sampling optical elements for a number of different times, each time from a known angle of incidence;

for each light wave of known spectrum and at each known angle of incidence, recording the electrical signals output by the array of optical sensors in response to the light wave being shone on the sampling optical elements, to obtain a sensor output; and training the untrained machine learning model using the sensor output for all light waves and all angles of incidence as training inputs, and using the known spectra for all light waves as training labels, wherein each set of training input for all angles of incidence and a given light wave share a same training label, to obtain the trained machine learning model.

6. The method of claim 5, wherein training the untrained machine learning model includes successively adjusting parameters of the machine learning model to minimize a cost function, the cost function being a root mean squared error between a model output computed from a training input and the corresponding training label.

7. The method of claim 1, wherein the machine learning model is a deep learning model which includes an input layer, an output layer, and one or more hidden layers connected to the input layer and the output layer, and is configured to perform computations on model input received at the input layer to generate model output at the output layer.

8. A spectral sensing system, comprising:
an array of sampling optical elements, each configured to have optical properties that alter a reflectance, or a transmittance, or a spatial distribution of an incident light falling on the sampling optical elements as a function of wavelength to produce an altered light, wherein the optical properties of different sampling optical elements are different;
an array of optical sensors, each disposed to receive the altered light from one of the sampling optical elements and to convert received light intensity to an electrical signal; and
a trained machine learning model implemented by computing processors and memories, the machine learning model configured to perform computations on received model input to generate model output, the machine learning model being coupled to receive, as the model input, data representing the electrical signals generated by the array of optical sensors,
wherein the machine learning model is configured to compute, as the model output, a spectrum of a light wave shining on the array of sampling optical elements at one or more unspecified angles of incidence, the machine learning model having been trained using a training dataset which includes: (1) training input, which have been obtained by shining each one of a plurality of different light waves with known spectra on the array of sampling optical elements for a number of different times, each time from a known angle of incidence, while recording the electrical signals output by the array of optical sensors as the training input, and (2) the known spectra of the plurality of light waves as training labels, wherein each set of training input for all angles of incidence and a given light wave share a same training label.

9. The spectral sensing system of claim 8, wherein the array of sampling optical elements includes an array of spectral filters corresponding to the array of optical sensors, wherein each one of the optical sensors is disposed to receive light that has interacted with the corresponding one of the sampling optical elements.

10. The spectral sensing system of claim 6, wherein the array of sampling optical elements includes a plurality of transmissive dispersive optical elements, wherein the array of optical sensors includes a plurality of sub-arrays of optical sensors, each transmissive dispersive optical element corresponding to a sub-array of optical sensors and disposed at a defined distance from a surface of the sub-array of optical sensors to transmit and disperse light incident on it to the sub-array of optical sensors.

11. The spectral sensing system of claim 6, wherein the array of sampling optical elements includes a plurality of reflective dispersive optical elements, wherein the array of optical sensors includes a plurality of sub-arrays of optical sensors, each reflective dispersive optical element corresponding to a sub-array of optical sensors and disposed to reflect and disperse light incident on it to the sub-array of optical sensors.

12. The spectral sensing system of claim 8, wherein the machine learning model has been trained by successively adjusting parameters of the machine learning model to minimize a cost function, the cost function being a root mean squared error between a model output computed from a training input and the corresponding training label.

13. The spectral sensing system of claim 8, wherein the machine learning model is a deep learning model which includes an input layer, an output layer, and one or more hidden layers connected to the input layer and the output layer, and is configured to perform computations on model input received at the input layer to generate model output at the output layer.

14. A method implemented in a hyperspectral imaging system, the hyperspectral imaging system comprising an imaging sensor formed of a plurality of identical spatial pixels, one or more imaging optical elements configured to form an image on the imaging sensor, and machine learning model implemented by computing processors and memories, each spatial pixel including an array of sampling optical elements and an array of optical sensors, wherein each sampling optical element is configured to have optical properties that alter a reflectance, or a transmittance, or a spatial distribution of an incident light falling on the sampling optical element as a function of wavelength to produce an altered light, wherein the optical properties of different sampling optical elements of each spatial pixel are different, wherein each optical sensor is disposed to receive altered light from one of the sampling optical elements and to convert received light intensity to an electrical signal, and wherein the machine learning model is configured to perform computations on received model input to generate model output, the method comprising:
a process of using the imaging sensor and the machine learning model to measure a hyperspectral image, wherein the machine learning model is a trained machine learning model, the process including:
by the imaging optical elements, forming an image of an object space on the imaging sensor;
for each spatial pixel,
recording the electrical signals output by the array of optical sensors in response to light received by the spatial pixel, to obtain target sensor output;
inputting the target sensor output to the input layer of the trained machine learning model; and
the trained machine learning model performing computation on the received model input to generate target model output, wherein the target model output represents a spectrum of the light received by the spatial pixel.

15. The method of claim 11, wherein for each spatial pixel, the array of sampling optical elements includes an array of spectral filters corresponding to the an array of optical sensors, wherein each one of the optical sensors is disposed to receive light that has interacted with the corresponding one of the sampling optical elements.

16. The method of claim 14, further comprising a process of training an untrained machine learning model to obtain the trained machine learning model, the process including:
generating a plurality of different light waves, each light wave having a known spectrum;
shining each of the plurality of light waves on one of the spatial pixels for a number of different times, each time from a known angle of incidence;
for each light wave of known spectrum and at each known angle of incidence, recording the electrical signals output by the array of optical sensors of the spatial pixel in response to the light wave being shone on the spatial pixel, to obtain a sensor output; and
training the untrained machine learning model using the sensor output for all light waves and all angles of incidence as training inputs, and using the known spectra for all light waves as training labels, wherein each set of training input for all angles of incidence and a given light wave share a same training label, to obtain the trained machine learning model.

17. The method of claim 16, wherein training the untrained machine learning model includes successively adjusting parameters of the machine learning model to minimize a cost function, the cost function being a root mean squared error between a model output computed from a training input and the corresponding training label.

18. The method of claim 14, wherein the machine learning model is a deep learning model which includes an input layer, an output layer, and one or more hidden layers connected to the input layer and the output layer, and is configured to perform computations on model input received at the input layer to generate model output at the output layer.

19. A hyperspectral imaging system, comprising:
an imaging sensor formed of a plurality of identical spatial pixels, each spatial pixel including:
an array of sampling optical elements, each configured to have optical properties that alter a reflectance, or a transmittance, or a spatial distribution of an incident light falling on the sampling optical elements as a function of wavelength to produce an altered light, wherein the optical properties of different sampling optical elements are different; and
an array of optical sensors, each disposed to receive the altered light from one of the sampling optical elements and to convert received light intensity to an electrical signal; and
one or more imaging optical elements configured to form an image on the imaging sensor; and
a trained machine learning model implemented by computing processors and memories, the machine learning model configured to perform computations on received model input to generate model output, the machine learning model being coupled to receive, as the model input, data representing the electrical signals generated by the array of optical sensors of any one of the spatial pixels,
wherein the machine learning model is configured to compute, as the model output, a spectrum of a light wave shining on the one of the spatial pixels, the machine learning model having been trained using a training dataset which includes: (1) training input, which have been obtained by shining each one of a plurality of different light waves with known spectra on a selected spatial pixel for a number of different times, each time from a known angle of incidence, while recording the electrical signals output by the array of optical sensors as the training input, and (2) the known spectra of the plurality of light waves as training labels, wherein each set of training input for all angles of incidence and a given light wave share a same training label.

20. The hyperspectral imaging system of claim 14, wherein for each spatial pixel, the array of sampling optical elements includes an array of spectral filters corresponding to the array of optical sensors, wherein each one of the optical sensors is disposed to receive light that has interacted with the corresponding one of the sampling optical elements.

21. The hyperspectral imaging system of claim 19, wherein the machine learning model has been trained by successively adjusting parameters of the machine learning model to minimize a cost function, the cost function being a root mean squared error between a model output computed from a training input and the corresponding training label.

22. The hyperspectral imaging system of claim 19, wherein the machine learning model is a deep learning model which includes an input layer, an output layer, and one or more hidden layers connected to the input layer and the output layer, and is configured to perform computations on model input received at the input layer to generate model output at the output layer.

* * * * *